United States Patent [19]
Karim et al.

[11] Patent Number: 6,130,356
[45] Date of Patent: Oct. 10, 2000

[54] CATALYSTS FOR THE OXIDATION OF ETHANE TO ACETIC ACID, METHODS OF MAKING AND USING THE SAME

[75] Inventors: Khalid Karim, Burnage, United Kingdom; Mohammad Al-Hazmi; Asad Khan, both of Riyadh, Saudi Arabia

[73] Assignee: Saudi Basic Industries Corporation, Saudi Arabia

[21] Appl. No.: 09/503,635

[22] Filed: Feb. 14, 2000

Related U.S. Application Data

[62] Division of application No. 09/219,702, Dec. 23, 1998, Pat. No. 6,060,421.

[51] Int. Cl.$^7$ ................................................ C07L 51/16
[52] U.S. Cl. ......................................................... 562/548
[58] Field of Search ............................................. 562/548

[56] References Cited

U.S. PATENT DOCUMENTS

| | | | |
|---|---|---|---|
| 3,057,915 | 10/1962 | Riemenschneider et al. | 260/533 |
| 3,131,223 | 4/1964 | Smidt et al. | 260/597 |
| 3,240,805 | 3/1966 | Naglieri . | |
| 3,301,905 | 1/1967 | Riemenschneider et al. | 260/597 |
| 4,148,757 | 4/1979 | Brazdil et al. | 252/432 |
| 4,250,346 | 2/1981 | Young et al. | 585/658 |
| 4,339,355 | 7/1982 | Decker et al. | 252/464 |
| 4,524,236 | 6/1985 | McCain | 585/658 |
| 4,568,790 | 2/1986 | McCain | 585/658 |
| 4,596,787 | 6/1986 | Manyik et al. | 502/312 |
| 4,899,003 | 2/1990 | Manyik et al. | 585/313 |
| 5,132,269 | 7/1992 | Sasaki et al. | 502/205 |
| 5,162,578 | 11/1992 | McCain et al. | 562/548 |
| 5,300,682 | 4/1994 | Blum et al. | 562/512.2 |

FOREIGN PATENT DOCUMENTS

| | | |
|---|---|---|
| 0 294 845 | 12/1988 | European Pat. Off. . |
| 0 407 091 A1 | 1/1991 | European Pat. Off. . |
| 0 480 594 A2 | 4/1992 | European Pat. Off. . |
| 0 518 548 A2 | 12/1992 | European Pat. Off. . |
| 0 620 205 A1 | 10/1994 | European Pat. Off. . |
| 0 627 401 A1 | 12/1994 | European Pat. Off. . |

OTHER PUBLICATIONS

E.M. Thorsteinson, et al., *Journal of Catalysis*, "The Oxidative Dehydrogenation of Ethane over Catalysts Containing Mixed Oxides of Molybdenum and Vanadium", vol. 51, pp. 116–132 (1978).

*Primary Examiner*—Gary Geist
*Assistant Examiner*—Robert W. Deemie
*Attorney, Agent, or Firm*—Whitman Breed Abbott & Morgan LLP

[57] ABSTRACT

A mixed metal oxide MoVLaPdNbXO catalytic system (wherein X=Al, Ga, Ge and/or Si) providing higher selectivity and space time yield of acetic acid at low pressure and low temperature in a single stage oxidation of ethane with a molecular oxygen-containing gas and steam.

26 Claims, No Drawings

CATALYSTS FOR THE OXIDATION OF ETHANE TO ACETIC ACID, METHODS OF MAKING AND USING THE SAME

This application is a continuation of application Ser. No. 09/219,702, filed Dec. 23, 1998, now U.S. Pat. No. 6,060, 421 which is incorporated herein by reference.

BACKGROUND OF THE INVENTION

1. Field of Invention

The invention relates to a mixed oxide catalytic system containing MoVLaNbPdX (where X=Al, Ga, Ge, and/or Si) for low temperature, low pressure selective oxidation of ethane or ethane/ethylene to acetic acid. The invention also relates to methods of using the same including a single stage catalytic process featuring high space time yields of acetic acid.

2. Description of the Related Art

Several publications are referenced in this application. The references describe the state of the art to which this invention pertains and are hereby incorporated by reference.

The use of molybdenum and vanadium containing catalyst systems for low temperature oxydehydrogenation of ethane to ethylene was reported by E. M. Thorsteinson et al. "The Oxidative Dehydrogenation of Ethane over Catalyst Containing Mixed Oxide of Molybdenum and Vanadium", *Journal of Catalysis*, Volume 52, pp. 116–132 (1978). This paper relates to mixed oxide catalysts containing molybdenum and vanadium together with another transition metal oxide, such as Ti, Cr, Mn, Fe, Co, Ni, Nb, Ta, or Ce. The catalysts are active at temperatures as low as 200° C. for the oxydehydrogenation of ethane to ethylene. Some acetic acid is produced as a by-product.

U.S. Pat. Nos. 4,250,346; 4,524,236; 4,568,790; 4,596, 787; and 4,899,003 relate to the low temperature oxydehydrogenation of ethane to ethylene. The first of these references discloses the use of catalysts of the formula $Mo_hV_iNb_jA_k$ in which A is Ce, K, P, Ni and/or U, h is 16, i is 1 to 8, j is 0.2 to 10, and k is 0.1 to 5.

U.S. Pat. No. 4,454,236 is directed to the use of a calcined catalyst of the formula $Mo_aV_bNb_cSb_dX_e$.

The above cited patents make reference to other patents concerned with the production of ethylene from ethane by the oxydehydrogenation process and all make reference to the formation of acetic acid as a by-product.

U.S. Pat. Nos. 4,339,355 and 4,148,757 relate to an oxide catalyst containing Mo, Nb, V and a fourth metal from Co, Cr, Fe, In, Mn or Y for the oxidation/ammoxidation of unsaturated aliphatic aldehyde to the corresponding saturated aliphatic carboxylic acids.

European Patent Publication No. 0 294 845 relates to a process for the higher selective production of acetic acid by the oxidation of ethane with oxygen in contact with a mixture of catalysts consisting of (A) a catalyst for oxydehydrogenation of ethane to ethylene and (B) a catalyst for hydration/oxidation of ethylene. The ethane oxydehydrogenation catalyst is represented by the formula $Mo_xV_yZ_z$, wherein Z can be nothing or Nb, Sb, Ta or W.

European Patent Publication No. 0 480 594 is directed to the use of an oxide catalyst composition comprising tungsten, vanadium, rhenium and at least one of the alkaline metals for the production of ethylene and acetic acid by oxidation of ethane with a molecular oxygen containing gas.

The replacement of tungsten in whole or part by molybdenum carried out in European Patent Publication No. 0 407 091 results in an increase in selectivity to acetic acid at the expense of the selectivity to ethylene.

European Patent Publication No. 0 518 548 relates to a process for the production of acetic acid by ethane oxidation in contact with a solid catalyst having the empirical formula $VP_aM_bO_x$, where M is one or more optional elements selected from Co, Cu, Re, Nb, W and many other elements, excluding molybdenum, a is 0.5 to 3 and b is 0 to 0.1.

European Patent Publication No. 0 627 401 relates to the use of a $V_aTi_bO_x$ catalyst for the oxidation of ethane to acetic acid. The catalyst composition may comprise additional components selected from a large list of possible elements. The reference does not disclose any examples of catalysts comprising those elements in combination with vanadium, titanium and oxygen.

Furthermore, recently reported catalysts containing molybdenum, niobium and vanadium with other additional components or promoters are reported for similar ethane oxidation applications (Copending application Ser. Nos. 08/293,075; 08/997,913 and 09/107,115).

Thus, none of the prior art discloses or suggests the advantages of the catalytic system disclosed in present invention for the selective production of carboxylic acids such as acetic acid from ethane or mixtures of ethane/ethylene.

It would be desirable to provide a catalyst for use in an improved method of making acetic acid from ethane.

OBJECTS OF THE INVENTION

It is an object of the invention to overcome the above-identified deficiencies.

It is another object of the invention to provide an improved catalytic system for the catalytic production of acetic acid from ethane.

It is a further object of the invention to provide an improved process for the production of acetic acid from ethane.

The foregoing and other objects and advantages of the invention will be set forth in or be apparent from the following description.

SUMMARY OF THE INVENTION

The present invention relates to a catalyst for the selective oxidation of ethane with molecular oxygen to acetic acid in a gas phase reaction at relatively high selectivity and productivity at temperatures from 150° C. to 450° C. and at pressures of 1–50 bar. This is achieved by using an improved mixed metal oxide catalyst composition having the formula:

$$Mo_aV_bLa_cPd_dNb_eX_fO_y$$

wherein:

X=at least one element selected from Al, Ga, Ge or Si;

a is 1;

b is 0.01 to 0.9, preferably 0.1 to 0.5;

c is >0 to 0.2, preferably >0 to 0.001;

d is >0 to 0.2, preferably >0 to 0.01;

e is >0 to 0.2, preferably 0.001 to 0.2;

f is >0 to 0.3, preferably 0.01 to 0.2 and y is the number of oxygen atoms required to satisfy the valency requirements of the elements present.

The catalyst disclosed in the present invention has a composition which differs from the prior art and contains other essential elements such as aluminum, gallium, germanium to control the acidic function of the catalyst. Further, the addition of lanthanum, in addition to other metals, controls the optimum oxidation interaction effect with the rest of the components of the catalyst. Overall, a combination effect of all the elements present in the catalyst disclosed in the present invention provides a catalyst with higher activity and selectivity to acetic acid, particularly at low pressures and low temperatures. The production of acetic acid at relatively low pressures and low temperatures can have a significant impact on the capital costs of the process.

The invention also relates to an improved process for the low temperature and low pressure selective oxidation of ethane or ethane/ethylene to acetic acid using the catalyst of the invention.

Other objects as well as aspects, features and advantages of the present invention will become apparent from a study of the present specification, including the claims and specific examples.

DESCRIPTION OF THE PREFERRED EMBODIMENTS

One aspect of the invention relates to an improved catalyst composition having the formula set forth above. The catalyst of the invention can be used with or without a support. Suitable supports for the catalyst include alumina, silica, titania, zirconia, zeolites, silicon carbide, Mo carbide, molecular sieves and other micro/nonporous materials, and mixtures thereof. When used on a support, the supported catalyst usually comprises from about 10 to 50% by weight of the catalyst composition, with the remainder being the support material.

Another aspect of the invention relates to methods of making the improved catalyst of the invention. The choice of the compounds used as well as the specific procedures followed in preparing a catalyst can have a significant effect on the performance of a catalyst. Preferably, the elements of the catalyst composition are in combination with oxygen as oxides.

According to one embodiment, the catalyst is prepared from a solution of soluble compounds (salts, complexes or other compounds) of each of the metals. The solution is preferably an aqueous system having a pH of 1 to 10, more preferably a pH of 1 to 7, at a temperature of from about 30° C. to about 100° C. The water is removed by filtration. The catalyst is then dried in an oven from 100 to 130° C. The dried catalyst is calcined by heating to a temperature from about 250° C. to about 600° C. in air or oxygen for a period of time from about one hour to about 16 hours to produce the desired catalyst composition.

Preferably, the molybdenum is introduced into the solution in the form of ammonium salts such as ammonium paramolybdate, or organic acid salts of molybdenum such as acetates, oxalates, mandelates and glycolates. Some other partially water soluble molybdenum compounds which may be used include molybdenum oxides, molybdic acid, and chlorides of molybdenum.

Preferably, the vanadium is introduced into the solution in the form of ammonium salts such as ammonium metavanadate and ammonium decavanadate, or organic salts of vanadium such as acetates, oxalates, oxides and tartrates.

Preferably, the palladium is introduced into the catalyst slurry in the form of salts of palladium such as acetates, chlorides, nitrates, etc.

Preferably, the niobium is introduced into the catalyst slurry in the form of oxides, chlorides, oxalates, etc.

Preferably, the aluminum, gallium, silicon and/or germanium are introduced into the catalyst slurry in the form of salts such as oxides, hydrate oxides, acetates, chlorides, nitrates, etc.

Preferably, the lanthanum is introduced into the catalyst slurry in the form of salts such as oxides, hydrate oxides, acetates, chlorides, nitrates, etc.

Yet another aspect of the invention relates to an improved method of making acetic acid from ethane using the catalyst of the invention. The raw material used as the source of the ethane can be a gas stream which contains at least five volume percent of ethane or mixtures of ethane and ethylene. The gas stream can also contain minor amounts of the $C_3$–$C_4$ alkanes and alkenes, preferably less than five volume percent of each. The gas stream can also contain major amounts, more than five volume percent, of nitrogen, carbon dioxide, and water in the form of steam.

The reaction mixture in carrying out the process is generally one mole of ethane, 0.01 to 2.0 moles of molecular oxygen either as pure oxygen or in the form of air, and zero to 4.0 moles of water in the form of steam. The addition of water as a co-feed plays an important role as a reaction diluent and as a heat moderator for the reaction. It also acts as a de-sorption accelerator for the reaction product in the vapor phase oxidation reaction or masking the sites responsible for the total oxidation resulting in an increased yield of acetic acid.

Thus, the gaseous components of the reaction mixture include ethane, oxygen and a diluent, and these components are preferably uniformly admixed prior to being introduced into the reaction zone. The components may be preheated, individually or after being admixed, prior to being introduced into the reaction zone, which should have a temperature of from about 150° C. to about 450° C.

The reaction zone generally has a pressure of from 1 to 50 bar, preferably from 1 to 30 bar; a temperature of from about 150° C. to about 450° C., preferably from 200° C. to 300° C.; a contact time between the reaction mixture and the catalyst of from about 0.01 second to 100 seconds, preferably from 0.1 second to 10 seconds; and a space hourly velocity of from about 50 to about 50,000 $h^{-1}$, preferably from 100 to 10,000 $h^{-1}$ and most preferably from 200 to 3,000 $h^{-1}$.

The reaction temperature is preferably provided by placing the catalyst bed within a tubular converter having walls placed in a furnace heated to the desired reaction temperature.

The oxygen concentration in the feed gas mixture can vary widely, from 0.1 to 50% or higher of the feed mixture by applying proper measures to avoid explosion problems. Air is the preferred source of oxygen in the feed. The amount of oxygen present may be a stoichiometric amount, or lower, of the hydrocarbons in the feed.

The process is generally carried out in a single stage with all the oxygen and reactants being supplied as a single feed with non-reacted initial reactants being recycled. However, multiple stage addition of oxygen to the reactor with an intermediate hydrocarbon feed can be used. This may improve productivity to acetic acid and avoid potentially hazardous conditions.

The catalyst system of the invention is not limited to the oxydehydrogenation of ethane to acetic acid and may be applied for oxidizing alpha-beta unsaturated aliphatic aldehydes in the vapor phase with molecular oxygen to produce the corresponding alpha-beta unsaturated carboxylic acids, C-3 alkane or alkene to corresponding acids and can also be applied for the ammoxidation of alkane/alkene.

EXAMPLES

The following examples are illustrative of some of the catalyst products and methods of making and using the same falling within the scope of the present invention. They are, of course, not to be considered in any way limitative of the invention. Numerous changes and modifications can be made with respect to the invention.

Example 1

$$Mo_1V_{0.398}La_{7.08e-6}Pd_{0.0003}Nb_{0.125}Al_{0.226}$$

Ammonium metavanadate (Aldrich Chemicals, Assay= 99.0%) in the amount of 7.6 grams was added to distilled water and heated to 90° C. with stirring. A yellow color solution with a pH between 4 and 7 was obtained (Solution A). 3.4 grams of niobium hydrate oxide and 28 grams of oxalic acid were added with water to the above solution with continuous stirring to give a clear solution with a pH of 1.5 to 0.4. Furthermore, ammonium paramolybdate tetra hydrated (Aldrich Chemicals A.C.S.-12054-85-2) in the amount of 28.8 grams was added to the solution with water. The required amount of lanthanum, aluminum, and palladium salts were then added slowly to the above mixture. This mixture was then dried. The resulting solid was placed in an oven at 120° C. for overnight drying. The dried material was cooled to room temperature and calcined at 350° C. The calcined catalyst was formulated into uniform particles of the 40–60 mesh size and loaded in a stainless steel fixed bed tubular autoclave reactor. The catalyst was tested with a gas feed composition of ethane, oxygen, nitrogen, water in the ratio of 40:8:32:20 at 300° C., at a pressure of 19 psi and a total flow of 300 cc/min. The reaction product showed an acetic acid space time yield of 117 (g of acetic acid per liter of catalyst per hour) at 5.7% ethane conversion.

Example 2

The procedure for the preparation of the catalyst and its composition was the same as described in Example 1 except the catalyst was tested with a gas feed composition of ethane, oxygen, nitrogen, water in the ratio of 40:8:32:20 at 280° C., at a pressure of 200 psi and a total flow of 300 cc/min. The reaction product showed an acetic acid space time yield of 310 (g of acetic acid per liter of catalyst per hour) at 10.7% ethane conversion.

Example 3

The procedure for the preparation of the catalyst and its composition was the same as described in Example 1 except the catalyst was tested with a gas feed composition of ethane, oxygen, nitrogen, water in the ratio of 40:15:25:20 at 300° C., at a pressure of 19 psi and a total flow of 75 cc/min. The reaction product showed an acetic acid space time yield of 93 (g of acetic acid per liter of catalyst per hour) at 16% ethane conversion.

Example 4

The procedure for the preparation of the catalyst and its composition was the same as described in Example 1 except the catalyst was tested with a gas feed composition of ethane, oxygen, nitrogen, water in the ratio of 40:8:32:20 at 280° C., at a pressure of 200 psi and a total flow of 77 cc/min. The reaction product showed an acetic acid space time yield of 95 (g of acetic acid per liter of catalyst per hour) at 10% ethane conversion with 85% selectivity to acetic acid.

Catalyst mentioned in the present invention showed an optimum redox and acidic behavior resulting in a high activity and high selectivity towards the partial oxidation products.

The above description of the invention is intended to the illustrative and not limiting. Various changes or modifications in the embodiments described may occur to those skilled in the art. These can be made without departing from the spirit and scope of the invention.

What is claimed is:

1. A single stage catalytic process for direct conversion of ethane or ethane/ethylene to acetic acid by means of oxidation comprising the step of oxidizing ethane or ethane/ethylene with oxygen or a compound capable of providing oxygen in a reaction zone in the presence of a catalyst containing a catalyst composition having the following formula $$Mo_aV_bLa_cPd_dNb_eX_fO_y,$$

wherein

X is at least one element selected from Al, Ga, Ge, and Si;

a is 1;

b is 0.01 to 0.9;

c is >0 to 0.2;

d is >0 to 0.2;

e is >0 to 0.2;

f is >0 to 0.3; and y is a number determined by the valence requirements of the elements Mo, V, La, Pd, Nb, and X in the catalyst composition.

2. The process of claim 1, wherein said oxidation is carried out by introducing a feed mixture comprising ethane into said reaction zone.

3. The process of claim 2, wherein said feed mixture further comprises air.

4. The process of claim 2, wherein said feed mixture comprises oxygen.

5. The process of claim 2, wherein said feed mixture comprises molecular oxygen ranging from 0.1 to 50% by volume of the feed.

6. The process of claim 2, wherein said feed mixture is diluted with steam in an amount ranging from 0 to 50% by volume.

7. The process of claim 1, wherein said oxidation is achieved while operating in gas phase at a temperature of from 150 to 450° C., under a pressure of from 1 to 50 bars, and with a contact time between the reaction mixture and the catalyst of from 0.1 to 50 seconds.

8. The process of claim 1, wherein said oxidation of ethane produces no or no significant amount of CO.

9. The process of claim 2, further comprising the multi-step introduction of oxygen into the feed mixture to increase the yield, selectively or both yield and selectivity of acetic acid.

10. The process of claim 1, wherein the selectivity of ethane to acetic acid is >82% at a conversion of ethane >7%.

11. The process of claim 1, wherein said catalyst is in the form of a fixed or fluidized bed or solid moving bed reactor.

12. A process for performing a catalytic chemical reaction in fluid phase comprising contacting at least one reactant in fluid phase under suitable reaction conditions with a catalyst containing a catalyst composition having the following formula $$Mo_aV_bLa_cPd_dNb_eX_fO_y,$$

wherein

X is at least one element selected from Al, Ga, Ge, and Si;

a is 1;

b is 0.01 to 0.9;

c is >0 to 0.2;

d is >0 to 0.2;

e is >0 to 0.2;

f is >0 to 0.3; and y is a number determined by the valence requirements of the elements Mo, V, La, Pd, Nb, and X in the catalyst composition.

13. The process of claim 12, wherein said catalytic chemical reaction converts one or more fluid phase reactants to one or more fluid phase products.

14. The process of claim 12, wherein said catalytic chemical reaction oxidizes lower alkanes to corresponding acids.

15. The process of claim 13, wherein said one or more fluid phase reactants comprise ethane and said one or more fluid phase products comprise acetic acid.

16. The process of claim 13, wherein said one or more fluid phase reactants comprise alpha-beta unsaturated aliphatic aldehydes and oxygen and said one or more fluid phase products comprise alpha-beta unsaturated carboxylic acids.

17. The process of claim 12, wherein the at least one reactant is C2–C8 alkane.

18. The process of claim 12, wherein the at least one reactant is ethane, ethylene, propane, propylene iso-butane or n-butane.

19. The process of claim 1, wherein a is 1; b is 0.1 to 0.5; c is >0 to 0.001; d is >0 to 0.01; e is 0.001 to 0.2; and f is 0.01 to 0.2.

20. The process of claim 1, wherein said catalyst is a supported catalyst comprising a support.

21. The process of claim 20, wherein said support is selected from the group consisting of alumina, silica, titania, zirconia, silicon carbide, Mo-carbide, zeolites and molecular sieves and other microporous/nanoporous materials.

22. The process of claim 20, wherein said supported catalyst comprises from 5 to 50% by weight catalyst composition and 50 to 95% by weight support.

23. The process of claim 12, wherein a is 1; b is 0.1 to 0.5; c is >0 to 0.001; d is >0 to 0.01; e is 0.001 to 0.2; and f is 0.01 to 0.2.

24. The process of claim 12, wherein said catalyst is a supported catalyst comprising a support.

25. The process of claim 24, wherein said support is selected from the group consisting of alumina, silica, titania, zirconia, silicon carbide, Mo-carbide, zeolites and molecular sieves and other microporous/nanoporous materials.

26. The process of claim 24, wherein said supported catalyst comprises from 5 to 50% by weight catalyst composition and 50 to 95% by weight support.

* * * * *